United States Patent
Chapman

(10) Patent No.: US 6,301,633 B1
(45) Date of Patent: *Oct. 9, 2001

(54) GENERIC SERIAL INTERFACE WITH AUTOMATIC RECONFIGURABILITY

(75) Inventor: John T. Chapman, Cupertino, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/520,411

(22) Filed: Mar. 8, 2000

Related U.S. Application Data

(62) Division of application No. 09/001,352, filed on Dec. 31, 1997.

(51) Int. Cl.[7] .............................. G06F 13/00; G06F 13/38
(52) U.S. Cl. ........................... 710/129; 710/126; 710/62; 710/63; 710/104; 439/189; 439/497; 326/30
(58) Field of Search .................................... 710/129, 100, 710/126, 128, 131, 62, 63, 8, 10, 11, 15, 16, 72, 73, 104; 439/189, 507, 497, 509; 326/30

(56) References Cited

U.S. PATENT DOCUMENTS

| | | | |
|---|---|---|---|
| 4,607,379 | * 8/1986 | Marshall, Jr. et al. | 375/377 |
| 4,887,260 | * 12/1989 | Carden et al. | 370/250 |
| 5,648,972 | * 7/1997 | Gharakhanian | 714/716 |
| 5,737,364 | * 4/1998 | Cohen et al. | 375/220 |
| 5,761,463 | * 6/1998 | Allen | 710/129 |

* cited by examiner

Primary Examiner—Rupal Dharia
(74) Attorney, Agent, or Firm—Marger Johnson & McCollom, P.C.

(57) ABSTRACT

A generic serial interface includes any one of multiple transition cables having a first connector conforming to one of several different serial interface standards. A second generic connector is connected to a second end of the transition cables. A configurable interface circuit is coupled to the generic connector and is automatically reconfigured according to the physical interface type associated with the transition cable. The interface circuit includes a termination resistor array that can connect different termination resistor values to the same generic signals on the generic connector according to the interface type. The termination resistor array in combination with a unique designation of generic signals allow a single interface to operate with many different serial interface standards both in DCE and DTE modes while requiring substantially fewer connector pins and simpler interface circuitry than existing generic interfaces.

13 Claims, 20 Drawing Sheets

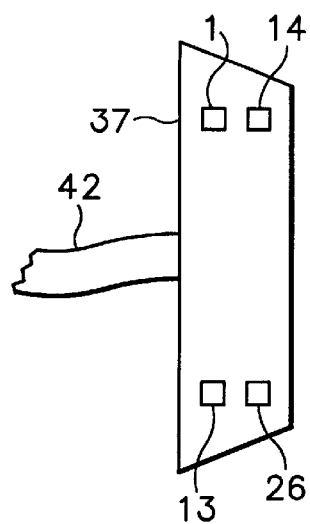
FIG.2
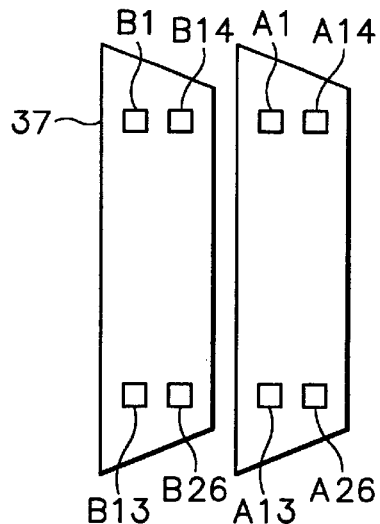
FIG.3
| PIN | SIGNAL | SIGNAL | PIN |
|---|---|---|---|
| 1 | O_TXD/RXD+ | O_TXD/RXD− | 14 |
| 2 | O_TXCE/RXC+ | O_TXCE/RXC− | 15 |
| 3 | B_TXC/TXC+ | B_TXC/TXC− | 16 |
| 4 | I_RXC/TXCE+ | I_RXC/TXCE− | 17 |
| 5 | I_RXD/TXD+ | I_RXD/TXD− | 18 |
| 6 | B_DCD/DCD+ | B_DCD/DCD− | 19 |
| 7 | O_DTR/DSR+ | O_DTR/DSR− | 20 |
| 8 | O_RTS/CTS+ | MODE 2 | 21 |
| 9 | O_RTS/CTS− | MODE 1 | 22 |
| 10 | I_CTS/RTS− | MODE 0 | 23 |
| 11 | I_CTS/RTS+ | MODE DCE | 24 |
| 12 | I_DSR/DTR+ | I_DSR/DTR− | 25 |
| 13 | B_LL/LL+ | GND | 26 |
FIG.4

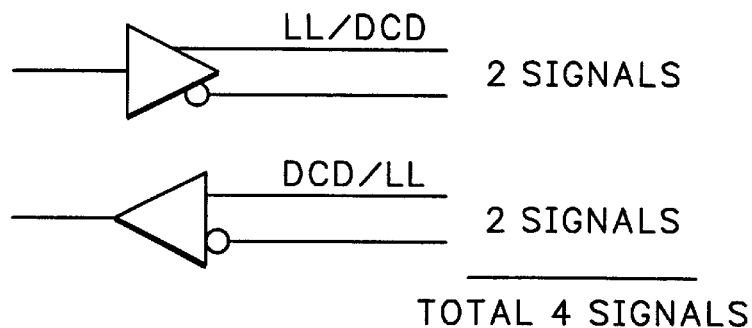
FIG.8
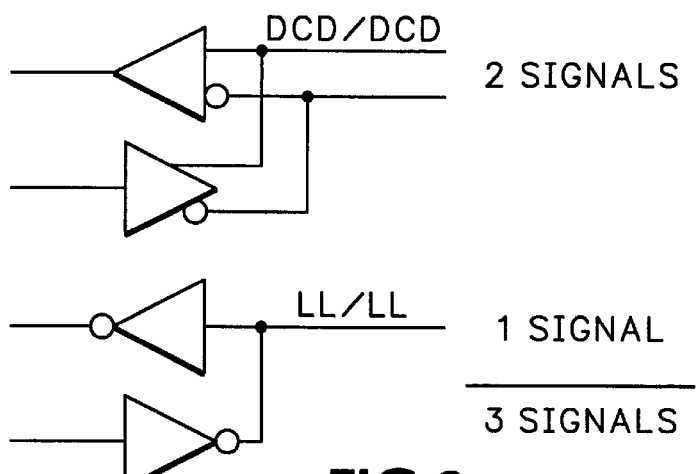
FIG.9
ALTERNATIVE SERIAL
CONTROL SIGNAL DES
| | EXAMPLE 1 | EXAMPLE 2 | EXAMPLE 3 |
|---|---|---|---|
| O_ | DTR/DSR | DTR/DCD | DTR/DSR |
| O_ | RTS/CTS | RTS/CTS | RTS/DCD |
| B_ | DCD/DCD | DSR/DSR | CTS/CTS |
| I_ | CTS/RTS | CTS/RTS | DCD/RTS |
| I_ | DSR/DTR | DCD/DTR | DSR/DTR |
| B_ | LL/LL | LL/LL | LL/LL |
~86
FIG.10

X.21 DTE Cable

X.21 DTE 72-

| FROM | SB | SIGNAL | NOTE | DIRECTION | SIGNAL | TO |
|---|---|---|---|---|---|---|
| J1-21 | X | MODE_2 | LOCAL | | | |
| J1-24 | X | MODE_DCE | CONNECTIONS | | | |
| J1-26 | X | GND | SHIELD | ---- | SHIELD GND | J2-1 |
| J1-1 | | O_TXD/RXD+ | TWISTED PAIR #5 | ----> | TRANSMIT+ | J2-2 |
| J1-14 | | O_TXD/RXD- | | ----> | TRANSMIT- | J2-9 |
| J1-8 | | O_RTS/CTS+ | TWISTED PAIR #3 | ----> | CONTROL+ | J2-3 |
| J1-9 | | O_RTS/CTS- | | ----> | CONTROL- | J2-10 |
| J1-5 | | I_RXD/TXD+ | TWISTED PAIR #8 | <---- | RECEIVE+ | J2-4 |
| J1-18 | | I_RXD/TXD- | | <---- | RECEIVE- | J2-11 |
| J1-11 | | I_CTS/RTS+ | TWISTED PAIR #2 | <---- | INDICATION+ | J2-5 |
| J1-10 | | I_CTS/RTS- | | <---- | INDICATION- | J2-12 |
| J1-4 | | I_RXC/TXCE+ | TWISTED PAIR #7 | <---- | TIMING+ | J2-6 |
| J1-17 | | I_RXC/TXCE- | | <---- | TIMING- | J2-13 |
| J1-25 | X | GND* | TWISTED PAIR #1 | ---- | CCT GND | J2-8 |
| | | NOT USED | | | NOT USED | |
| | | NOT USED | TWISTED PAIR #4 | | NOT USED | |
| | | NOT USED | | | NOT USED | |
| | | NOT USED | TWISTED PAIR #6 | | NOT USED | |
| | | NOT USED | | | NOT USED | |
| | | NOT USED | TWISTED PAIR #9 | | NOT USED | |
| | | NOT USED | | | NOT USED | |

J2 connector is a DB 15 plug
J1 shorting block has 4 connections
J2 has no pigtail

FIG. 12A

X.21 DCE Cable

| FROM | SB | SIGNAL | NOTE | X.21 DCE 72- | | | |
|---|---|---|---|---|---|---|---|
| | | | | SIGNAL | DIRECTION | SIGNAL | TO |
| J1-21 | X | MODE_2 | LOCAL CONNECTIONS | | | | |
| J1-26 | X | GND | SHIELD | SHIELD GND | | | J2-1 |
| J1-5 | | I_RXD/TXD+ | TWISTED PAIR #5 | TRANSMIT+ | <----- | | J2-2 |
| J1-18 | | I_RXD/TXD- | | TRANSMIT- | <----- | | J2-9 |
| J1-11 | | I_CTS/RTS+ | TWISTED PAIR #3 | CONTROL+ | <----- | | J2-3 |
| J1-10 | | I_CTS/RTS- | | CONTROL- | <----- | | J2-10 |
| J1-1 | | O_TXD/RXD+ | TWISTED PAIR #8 | RECEIVE+ | -----> | | J2-4 |
| J1-14 | | O_TXD/RXD- | | RECEIVE- | -----> | | J2-11 |
| J1-8 | | O_RTS/CTS+ | TWISTED PAIR #2 | INDICATION+ | -----> | | J2-5 |
| J1-9 | | O_RTS/CTS- | | INDICATION- | -----> | | J2-12 |
| J1-2 | | O_TXCE/RXC+ | TWISTED PAIR #7 | TIMING+ | -----> | | J2-6 |
| J1-15 | | O_TXCE/RXC- | | TIMING- | -----> | | J2-13 |
| J1-25 | X | GND* | TWISTED PAIR #1 | GND | ----- | | J2-8 |
| | | NOT USED | | NOT USED | | | |
| | | NOT USED | | NOT USED | | | |
| | | NOT USED | TWISTED PAIR #4 | NOT USED | | | |
| | | NOT USED | | NOT USED | | | |
| | | NOT USED | TWISTED PAIR #6 | NOT USED | | | |
| | | NOT USED | | NOT USED | | | |
| | | NOT USED | TWISTED PAIR #9 | NOT USED | | | |

J2 connector is a DB 15 receptacle
J1shortinig Block has 3 connections
J2 has no pigtail

FIG. 12B

V.35 DTE Cable

| FROM | SB | SIGNAL | NOTE | V.35 DTE 72-<br>DIRECTION | SIGNAL | PT | TO |
|---|---|---|---|---|---|---|---|
| J1-22 | X | MODE_1 | LOCAL | | | | |
| J1-23 | X | MODE_0 | CONNECTIONS | | | | |
| J1-24 | X | MODE_DCE | | | | | |
| J1-25 | X | GND* | SHIELD | ---- | SHIELD GND | | J2-A |
| J1-8 | | O_RTS/CTS+ | TWISTED PAIR | ----> | RTS | | J2-C |
| J1-7 | | O_DTR/DSR+ | #4 | ----> | DTR | | J2-H |
| J1-11 | | I_CTS/RTS+ | TWISTED PAIR | <---- | CTS | | J2-D |
| J1-12 | | I_DSR/DTR+ | #2 | <---- | DSR | | J2-E |
| J1-6 | | B_DCD/DCD+ | TWISTED PAIR | <---- | RLSD | | J2-F |
| J1-19 | X | GND* | #1 | ---- | GND | X | J2-B |
| J1-13 | | B_LL/LL+ | TWISTED PAIR | ----> | LT | | J2-K |
| J1-26 | X | GND | #3 | ---- | GND | X | J2-B |
| J1-1 | | O_TXD/RXD+ | TWISTED PAIR | ----> | SD+ | | J2-P |
| J1-14 | | O_TXD/RXD- | #5 | ----> | SD- | | J2-S |
| J1-5 | | I_RXD/TXD+ | TWISTED PAIR | <---- | RD+ | | J2-R |
| J1-18 | | I_RXD/TXD- | #9 | <---- | RD- | | J2-T |
| J1-2 | | O_TXCE/RXC+ | TWISTED PAIR | ----> | SCTE+ | | J2-U |
| J1-15 | | O_TXCE/RXC- | #6 | ----> | SCTE- | | J2-W |
| J1-4 | | I_RXC/TXCE+ | TWISTED PAIR | <---- | SCR+ | | J2-V |
| J1-17 | | I_RXC/TXCE- | #8 | <---- | SCR- | | J2-X |
| J1-3 | | B_TXC/TXC+ | TWISTED PAIR | <---- | SCT+ | | J2-Y |
| J1-16 | | B_TXC/TXC- | #7 | <---- | SCT- | | J2-AA |

J2 connector is a V.35 plug
J1 shorting block has 6 connections
J2 has 2 wires on 1 pin

FIG. 12C

V.35 DCE Cable

V.35 DCE 72-

| FROM | SB | SIGNAL | NOTE | LOCAL CONNECTIONS | DIRECTION | SIGNAL | PT | TO |
|---|---|---|---|---|---|---|---|---|
| J1-22 | X | MODE_1 | | | | | | |
| J1-23 | X | MODE_0 | | | | | | |
| J1-25 | X | GND* | SHIELD | | ---- | SHIELD GND | | J2-A |
| J1-11 | | I_CTS/RTS+ | TWISTED PAIR #4 | | <---- | RTS | | J2-C |
| J1-12 | | I_DSR/DTR+ | | | <---- | DTR | | J2-H |
| J1-8 | | O_RTS/CTS+ | TWISTED PAIR #2 | | ----> | CTS | | J2-D |
| J1-7 | | O_DTR/DSR+ | | | ----> | DSR | | J2-E |
| J1-6 | | B_DCD/DCD+ | TWISTED PAIR #1 | | ----> | RLSD | | J2-F |
| J1-19 | X | GND | | | | GND | X | J2-B |
| J1-13 | | B_LL/LL+ | TWISTED PAID #3 | | <---- | LT | | J2-K |
| J1-26 | X | GND | | | | GND | X | J2-B |
| J1-5 | | I_RXD/TXD+ | TWISTED PAIR #5 | | <---- | SD+ | | J2-P |
| J1-18 | | I_RXD/TXD- | | | <---- | SD- | | J2-S |
| J1-1 | | O_TXD/RXD+ | TWISTED PAIR #9 | | ----> | RD+ | | J2-R |
| J1-14 | | O_TXD/RXD- | | | ----> | RD- | | J2-T |
| J1-4 | | I_RXC/TXCE+ | TWISTED PAIR #6 | | <---- | SCTE+ | | J2-U |
| J1-17 | | I_RXC/TXCE- | | | <---- | SCTE- | | J2-W |
| J1-2 | | O_TXCE/RXC+ | TWISTED PAIR #8 | | ----> | SCR+ | | J2-V |
| J1-15 | | O_TXCE/RXC- | | | ----> | SCR- | | J2-X |
| J1-3 | | B_TXC/TXC+ | TWISTED PAIR #7 | | ----> | SCT+ | | J2-Y |
| J1-16 | | B_TXC/TXC- | | | ----> | SCT- | | J2-AA |

J2 connector is a V.35 receptacle
J1 shorting block has 5 connections
J2 has 2 wires on 1 pin

FIG. 12D

RS 232/V.24 DTE Cable

R-232/V.24 DTE 72-

| FROM | SB | SIGNAL | NOTE | DIRECTION | SIGNAL | PT | TO |
|---|---|---|---|---|---|---|---|
| | | | LOCAL CONNECTIONS | | | | |
| J1-23 | X | MODE_0 | | | | | |
| J1-24 | X | MODE_DCE | | | | | |
| J1-25 | X | GND* | SHIELD | ----- | SHIELD GND | | J2-1 |
| J1-1 | | O_TXD/RXD+ | TWISTED PAIR #5 | ---> | TXD | | J2-2 |
| J1-14 | X | GND* | | | GND | X | J2-7 |
| J1-5 | | I_RXD/TXD+ | TWISTED PAIR #9 | <--- | RXD | | J2-3 |
| J1-18 | X | GND* | | | GND | X | J2-7 |
| J1-8 | | O_RTS/CTS+ | TWISTED PAIR #4 | ---> | RTS | | J2-4 |
| J1-7 | | O_DTR/DSR+ | | ---> | DTR | | J2-20 |
| J1-11 | | I_CTS/RTS+ | TWISTED PAIR #2 | <--- | CTS | | J2-5 |
| J1-12 | | I_DSR/DTR+ | | <--- | DSR | | J2-6 |
| J1-6 | | B_DCD/DCD+ | TWISTED PAIR #1 | <--- | DCD | | J2-8 |
| J1-19 | X | GND* | | | GND | X | J2-7 |
| J1-3 | | B_TXC/TXC+ | TWISTED PAIR #7 | <--- | TXC | | J2-15 |
| J1-16 | X | GND* | | | GND | X | J2-7 |
| J1-4 | | I_RXC/TXCE+ | TWISTED PAIR #8 | <--- | RXC | | J2-17 |
| J1-17 | X | GND* | | | GND | X | J2-7 |
| J1-13 | | B_LL/LL+ | TWISTED PAIR #3 | ---> | LTST | | J2-18 |
| J1-26 | X | GND | | | GND | X | J2-7 |
| J1-2 | | O_TXCE/RXC+ | TWISTED PAIR #6 | ---> | TXCE | | J2-24 |
| J1-15 | X | GND* | | | GND | X | J2-7 |

J2 connector is a DB 25 plug
J1 shorting block has 10 connections
J2 pigtail has 7+1 wires

FIG. 12E

RS 232/V.24 DCE Cable

RS-232/V.24 DCE 72-

| FROM | SB | SIGNAL | NOTE | LOCAL CONNECTIONS | DIRECTION | SIGNAL | PT | TO |
|---|---|---|---|---|---|---|---|---|
| J1-23 | X | MODE_0 | | | | | | |
| J1-25 | X | GND* | SHIELD | | | SHIELD GND | | J2-1 |
| J1-5 | | I-RXD/TXD+ | TWISTED PAIR #5 | | <---- | TXD | X | J2-2 |
| J1-18 | X | GND* | | | ---- | GND | | J2-7 |
| J1-1 | | O_TXD/RXD+ | TWISTED PAIR #9 | | ----> | RXD | X | J2-3 |
| J1-14 | X | GND* | | | ---- | GND | | J2-7 |
| J1-11 | | I_CTS/RTS+ | TWISTED PAIR #2 | | <---- | RTS | | J2-4 |
| J1-12 | | I_DSR/DTR+ | | | <---- | DTR | | J2-20 |
| J1-8 | | O_RTS/CTS+ | TWISTED PAIR #4 | | ----> | CTS | | J2-5 |
| J1-7 | | O_DTR/DSR+ | | | ----> | DSR | | J2-6 |
| J1-6 | | B_DCD/DCD+ | TWISTED PAIR #1 | | ----> | DCD | X | J2-8 |
| J1-19 | X | GND* | | | ---- | GND | | J2-7 |
| J1-3 | | B_TXC/TXC+ | TWISTED PAIR #7 | | ----> | TXC | X | J2-15 |
| J1-16 | X | GND* | | | ---- | GND | | J2-7 |
| J1-2 | | O_TXCE/RXC+ | TWISTED PAIR #8 | | ----> | RXC | X | J2-17 |
| J1-15 | X | GND* | | | ---- | GND | | J2-7 |
| J1-13 | | B_LL/LL+ | TWISTED PAIR #3 | | <---- | LTST | X | J2-18 |
| J1-26 | X | GND | | | ---- | GND | | J2-7 |
| J1-4 | | I_RXC/TXCE+ | TWISTED PAIR #6 | | <---- | TXCE | X | J2-24 |
| J1-17 | X | GND* | | | ---- | GND | | J2-7 |

J2 connector is a DB 25 receptacle
J1 shorting block has 9 connections
J2 pigtail has 7+1 wires

FIG. 12F

RS 449/V.36 DTE Cable

RS-449/V.36 DTE 72-

| FROM | SB | SIGNAL | NOTE<br>LOCAL<br>CONNECTIONS | DIRECTION | SIGNAL | PT | TO |
|---|---|---|---|---|---|---|---|
| J1-22 | (X) | MODE_1 | | | | | |
| J1-24 | (X) | MODE_DCE | | | | | |
| J1-24 | X | GND | SHIELD | | SHIELD GND | | J2-1 |
| J1-1 | | O_TXD/RXD+ | TWISTED PAIR #5 | ----> | SD+ | | J2-4 |
| J1-14 | | O_TXD/RXD- | | ----> | SD- | | J2-22 |
| J1-3 | | B_TXC/TXC+ | TWISTED PAIR #7 | <---- | ST+ | | J2-5 |
| J1-16 | | B_TXC/TXC- | | <---- | ST- | | J2-23 |
| J1-5 | | I_RXD/TXD+ | TWISTED PAIR #9 | <---- | RD+ | | J2-6 |
| J1-18 | | I_RXD/TXD- | | <---- | RD- | | J2-24 |
| J1-8 | | O_RTS/CTS+ | TWISTED PAIR #1 | ----> | RS+ | | J2-7 |
| J1-9 | | O_RTS/CTS- | | ----> | RS- | | J2-25 |
| J1-4 | | I_RXC/TXCE+ | TWISTED PAIR #8 | <---- | RT+ | | J2-8 |
| J1-17 | | I_RXC/TXCE- | | <---- | RT- | | J2-26 |
| J1-11 | | I_CTS/RTS+ | TWISTED PAIR #4 | <---- | CS+ | | J2-9 |
| J1-10 | | I_CTS/RTS- | | <---- | CS- | | J2-27 |
| J1-13 | | B_LL/LL+ | TWISTED PAIR #12 | ----> | LL | | J2-10 |
| J1-26 | X | GND | | | SC | | J2-37 |
| J1-12 | | I_DSR/DTR+ | TWISTED PAIR #10 | <---- | DM+ | | J2-11 |
| J1-25 | | I_DSR/DTR- | | <---- | DM- | | J2-29 |
| J1-7 | | O_DTR/DSR+ | TWISTED PAIR #3 | ----> | TR+ | | J2-12 |
| J1-20 | | O_DTR/DSR- | | ----> | TR- | | J2-30 |
| J1-6 | | B_DCD/DCD+ | TWISTED PAIR #11 | <---- | RR+ | | J2-13 |
| J1-19 | | B_DCD/DCD- | | <---- | RR- | | J2-31 |
| J1-2 | | O_TXCE/RXC+ | TWISTED PAIR #6 | ----> | TT+ | | J2-17 |
| J1-15 | | O_TXCE/RXC- | | ----> | TT- | | J2-35 |
| J1-22 | X | GND* | TWISTED PAIR #2 | | SG | X | J2-19 |
| | | NOT USED | | NOT USED | RC | X | J2-20 |

J2 connector is a DB 37 receptacle
J1 shorting block has 3 connections
J2 pigtail has 2+1 wires

FIG. 12G

RS 449/V.36 DCE Cable

RS-449/V.36 DCE 72-

| FROM | SB | SIGNAL | NOTE | LOCAL CONNECTIONS | DIRECTION | SIGNAL | PT | TO |
|---|---|---|---|---|---|---|---|---|
| J1-22 | | MODE_1 | | | | | | |
| J1-22 | X | GND* | SHIELD | | ---- | SHIELD GND | | J2-1 |
| J1-5 | | I_RXD/TXD+ | TWISTED PAIR #5 | | <---- | SD+ | | J2-4 |
| J1-18 | | I_RXD/TXD- | | | <---- | SD- | | J2-22 |
| J1-3 | | B_TXC/TXC+ | TWISTED PAIR #7 | | ----> | ST+ | | J2-5 |
| J1-16 | | B_TXC/TXC- | | | ----> | ST- | | J2-23 |
| J1-1 | | O_TXD/RXD+ | TWISTED PAIR #9 | | ----> | RD+ | | J2-6 |
| J1-14 | | O_TXD/RXD- | | | ----> | RD- | | J2-24 |
| J1-11 | | I_CTS/RTS+ | TWISTED PAIR #1 | | <---- | RS+ | | J2-7 |
| J1-10 | | I_CTS/RTS- | | | <---- | RS- | | J2-25 |
| J1-2 | | O_TXCE/RXC+ | TWISTED PAIR #8 | | ----> | RT+ | | J2-8 |
| J1-15 | | O_TXCE/RXC- | | | ----> | RT- | | J2-26 |
| J1-8 | | O_RTS/CTS+ | TWISTED PAIR #4 | | ----> | CS+ | | J2-9 |
| J1-9 | | O_RTS/CTS- | | | ----> | CS- | | J2-27 |
| J1-13 | | B_LL/LL+ | TWISTED PAIR #12 | | ----> | LL | | J2-10 |
| J1-26 | X | GND | | | | SC | X | J2-37 |
| J1-7 | | O_DTR/DSR+ | TWISTED PAIR #10 | | ----> | DM+ | | J2-11 |
| J1-20 | X | O_DTR/DSR- | | | ----> | DM- | | J2-29 |
| J1-12 | | I_DSR/DTR+ | TWISTED PAIR #3 | | <---- | TR+ | | J2-12 |
| J1-25 | | I_DSR/DTR- | | | <---- | TR- | | J2-30 |
| J1-6 | | B_DCD/DCD+ | TWISTED PAIR #11 | | ----> | RR+ | | J2-13 |
| J1-19 | | B_DCD/DCD- | | | ----> | RR- | | J2-31 |
| J1-4 | | I_RXC/TXCE+ | TWISTED PAIR #6 | | <---- | TT+ | | J2-17 |
| J1-17 | | I_RXC/TXCE- | | | <---- | TT- | | J2-35 |
| | | NOT USED | | | NOT USED | SG | X | J2-19 |
| | | NOT USED | | | NOT USED | RC | X | J2-20 |

J2 connector is a DB 37 receptacle
J1shorting block has 2 connections
J2 pigtail has 3+1 wires

FIG. 12H

RS 530 DTE Cable

RS-530 DTE 72-

| FROM | SB | SIGNAL | NOTE | DIRECTION | SIGNAL | TO |
|---|---|---|---|---|---|---|
| J1-21 | X | MODE_2 | LOCAL CONNECTIONS | | | |
| J1-23 | X | MODE_0 | | | | |
| J1-24 | (X) | MODE_DCE | | | | |
| J1-24 | X | GND* | SHIELD | ----- | SHIELD GND | J2-1 |
| J1-1 | | O_TXD/RXD+ | TWISTED PAIR #5 | ---> | BA(A); TXD+ | J2-2 |
| J1-14 | | O_TXD/RXD- | | ---> | BA(B); TXD- | J2-14 |
| J1-5 | | I_RXD/TXD+ | TWISTED PAIR #9 | <--- | BB(A); RXD+ | J2-3 |
| J1-18 | | I_RXD/TXD- | | <--- | BB(B); RXD- | J2-16 |
| J1-8 | | O_RTS/CTS+ | TWISTED PAIR #1 | ---> | CA(A); RTS+ | J2-4 |
| J1-9 | | O_RTS/CTS- | | ---> | CA(B); RTS- | J2-19 |
| J1-11 | | I_CTS/RTS+ | TWISTED PAIR #4 | <--- | CB(A); CTS+ | J2-5 |
| J1-10 | | I_CTS/RTS- | | <--- | CB(B); CTS- | J2-13 |
| J1-12 | | I_DSR/DTR+ | TWISTED PAIR #10 | <--- | CC(A); DSR+ | J2-6 |
| J1-25 | | I_DSR/DTR- | | <--- | CC(B); DSR- | J2-22 |
| J1-6 | | B_DCD/DCD+ | TWISTED PAIR #11 | <--- | CF(A); DCD+ | J2-8 |
| J1-19 | | B_DCD/DCD- | | <--- | CF(B); DCD- | J2-10 |
| J1-3 | | B_TXC/TXC+ | TWISTED PAIR #7 | <--- | DB(A); TXC+ | J2-15 |
| J1-16 | | B_TXC/TXC- | | <--- | DB(B); TXC- | J2-12 |
| J1-4 | | I_RXC/TXCE+ | TWISTED PAIR #8 | <--- | DD(A); RXC+ | J2-17 |
| J1-17 | | I_RXC/TXCE- | | <--- | DD(B); RXC- | J2-9 |
| J1-13 | | B_LL/LL+ | TWISTED PAIR #12 | ---> | LL | J2-18 |
| J1-26 | X | GND | | | GND | J2-7 |
| J1-7 | | O_DTR/DSR+ | TWISTED PAIR #3 | ---> | CD(A); DTR+ | J2-20 |
| J1-20 | | O_DTR/DSR- | | ---> | CD(B); DTR- | J2-23 |
| J1-2 | | O-TXCE/RXC+ | TWISTED PAIR #6 | ---> | DA(A); TXCE+ | J2-24 |
| J1-15 | | O_TXCE/RXC- | | ---> | DA(B); TXCE- | J2-11 |
| | | NOT USED | TWISTED PAIR #2 | | NOT USED | |
| | | NOT USED | | | NOT USED | |

J2 connector is a DB 25 plug
J1shorting block has 4 connections
J2 has no pigtail

FIG. 12I

RS 530 DCE Cable

| FROM | SB | SIGNAL | NOTE | RS-530 DCE 72- | | | |
|------|----|----|------|------|------|------|------|
| | | | | DIRECTION | SIGNAL | | TO |
| J1-21 | X | MODE_2 | LOCAL CONNECTIONS | | | | |
| J1-23 | (X) | MODE_0 | | | | | |
| J1-23 | X | GND | SHIELD | ---- | SHIELD GND | | J2-1 |
| J1-5 | | I_RXD/TXD+ | TWISTED PAIR #5 | <---- | BA(A); TXD+ | | J2-2 |
| J1-18 | | I_RXD/TXD- | | <---- | BA(B); TXD- | | J2-14 |
| J1-1 | | O_TXD/RXD+ | TWISTED PAIR #9 | ----> | BB(A); RXD+ | | J2-3 |
| J1-14 | | O_TXD/RXD- | | ----> | BB(B); RXD- | | J2-16 |
| J1-11 | | I_CTS/RTS+ | TWISTED PAIR #1 | <---- | CA(A);RTS+ | | J2-4 |
| J1-10 | | I_CTS/RTS- | | <---- | CA(B); RTS- | | J2-19 |
| J1-8 | | O_RTS/CTS+ | TWISTED PAIR #4 | ----> | CB(A); CTS+ | | J2-5 |
| J1-9 | | O_RTS/CTS- | | ----> | CB(B); CTS- | | J2-13 |
| J1-7 | | O_DTR/DSR+ | TWISTED PAIR #10 | ----> | CC(A); DSR+ | | J2-6 |
| J1-20 | | O_DTR/DSR- | | ----> | CC(B); DSR- | | J2-22 |
| J1-6 | | B_DCD/DCD+ | TWISTED PAID #11 | ----> | CF(A); DCD+ | | J2-8 |
| J1-19 | | B_DCD/DCD- | | ----> | CF(B); DCD- | | J2-10 |
| J1-3 | | B_TXC/TXC+ | TWISTED PAIR #7 | ----> | DB(A); TXC+ | | J2-15 |
| J1-16 | | B_TXC/TXC- | | ----> | DB(B); TXC- | | J2-12 |
| J1-2 | | O_TXCE/RXC+ | TWISTED PAIR #8 | ----> | DD(A); RXC+ | | J2-17 |
| J1-15 | | O_TXCE/RXC- | | ----> | DD(B); RXC- | | J2-9 |
| J1-13 | | B_LL/LL+ | TWISTED PAIR #12 | <---- | LL | | J2-18 |
| J1-26 | X | GND | | ---- | GND | | J2-7 |
| J1-12 | | I_DSR/DTR+ | TWISTED PAIR #3 | <---- | CD(A); DTR+ | | J2-20 |
| J1-25 | | I_DSR/DTR- | | <---- | CD(B); DTR- | | J2-23 |
| J1-4 | | I_RXC/TXCE+ | TWISTED PAIR #6 | <---- | DA(A); TXCE+ | | J2-24 |
| J1-17 | | I_RXC/TXCE- | | <---- | DA(B); TXCE- | | J2-11 |
| | | NOT USED | TWISTED PAIR #2 | | NOT USED | | |
| | | NOT USED | | | NOT USED | | |

J2 connector is a DB 25 receptacle
J1 shorting block has 3 connections
J2 has no pigtail

FIG. 12J

RS 530A DTE Cable

RS-530A DTE 72-

| FROM | SB | SIGNAL | NOTE | DIRECTION | SIGNAL | PT | TO |
|---|---|---|---|---|---|---|---|
| J1-21 | X | MODE_2 | | | | | |
| J1-22 | X | MODE_1 | | | | | |
| J1-24 | (X) | MODE_DCE | | | | | |
| J1-24 | X | GND | SHIELD | ----- | SHIELD GND | | J2-1 |
| J1-1 | | O_TXD/RXD+ | TWISTED PAIR #5 | ----> | BA(A); TXD+ | | J2-2 |
| J1-14 | | O_TXD/RXD- | | ----> | BA(B); TXD- | | J2-14 |
| J1-5 | | I_RXD/TXD+ | TWISTED PAIR #9 | <---- | BB(A); RXD+ | | J2-3 |
| J1-18 | | I_RXD/TXD- | | <---- | BB(B); RXD- | | J2-16 |
| J1-8 | | O_RTS/CTS+ | TWISTED PAIR #1 | ----> | CA(A); RTS+ | | J2-4 |
| J1-9 | | O_RTS/CTS- | | ----> | CA(B); RTS- | | J2-19 |
| J1-11 | | I_CTS/RTS+ | TWISTED PAIR #4 | <---- | CB(A); CTS+ | | J2-5 |
| J1-10 | | I_CTS/RTS- | | <---- | CB(B); CTS- | | J2-13 |
| J1-12 | | I_DSR/DTR+ | TWISTED PAIR #10 | <---- | CC(A); DSR+ | | J2-6 |
| J1-25 | X | GND* | | ----- | AC; GND | X | J2-23 |
| J1-6 | | B_DCD/DCD+ | TWISTED PAIR #11 | <---- | CF(A); DCD+ | | J2-8 |
| J1-19 | | B_DCD/DCD- | | <---- | CF(B); DCD- | | J2-10 |
| J1-3 | | B_TXC/TXC+ | TWISTED PAIR #7 | <---- | DB(A); TXC+ | | J2-15 |
| J1-16 | | B_TXC/TXC- | | <---- | DB(B); TXC- | | J2-12 |
| J1-4 | | I_RXC/TXCE+ | TWISTED PAIR #8 | <---- | DD(A); RXC+ | | J2-17 |
| J1-17 | | I_RXC/TXCE- | | <---- | DD(B); RXC- | | J2-9 |
| J1-13 | | B_LL/LL+ | TWISTED PAIR #12 | ----> | LL | | J2-18 |
| J1-26 | X | GND | | ----- | AB; GND | | J2-7 |
| J1-7 | | O_DTR/DSR+ | TWISTED PAIR #3 | ----> | CO(A); DTR+ | | J2-20 |
| J1-20 | X | GND* | | ----- | AC; GND | X | J2-23 |
| J1-2 | | O_TXCE/RXC+ | TWISTED PAIR #6 | ----> | DA(A); TXCE+ | | J2-24 |
| J1-15 | | O_TXCE/RXC- | | ----> | DA(B); TXCE- | | J2-11 |
| | | NOT USED | TWISTED PAIR #12 | | NOT USED | | |
| | | NOT USED | | | NOT USED | | |

J2 connector is a DB 25 plug
J1 shorting block has 6 connections
J2 has 2 wires in one pin

FIG. 12K

V.35 DTE Female Cable

| FROM | SB | SIGNAL | NOTE | DIRECTION | SIGNAL | PT | TO |
|---|---|---|---|---|---|---|---|
| | | | V.35 DTE Female 72- | | | | |
| J1-22 | X | MODE_1 | LOCAL CONNECTIONS | | | | |
| J1-23 | X | MODE_0 | | | | | |
| J1-24 | X | MODE_DCE | | | | | |
| J1-25 | X | GND* | SHIELD | ---- | SHIELD GND | | J2-A |
| J1-8 | | O_RTS/CTS+ | TWISTED PAIR #4 | ----> | RTS | | J2-C |
| J1-7 | | O_DTR/DSR+ | | ----> | DTR | | J2-H |
| J1-11 | | I_CTS/RTS+ | TWISTED PAIR #2 | <---- | CTS | | J2-D |
| J1-12 | | I_DSR/DTR+ | | <---- | DSR | | J2-E |
| J1-6 | | B_DCD_DCD+ | TWISTED PAIR #1 | ---- | RLSD | | J2-F |
| J1-19 | X | GND* | | | GND | X | J2-B |
| J1-13 | | B_LL/LL+ | TWISTED PAIR #3 | ----> | LT | | J2-K |
| J1-26 | X | GND | | | GND | X | J2-B |
| J1-1 | | O_TXD/RXD+ | TWISTED PAIR #5 | ----> | SD+ | | J2-P |
| J1-14 | | O_TXD/RXD- | | ----> | SD- | | J2-S |
| J1-5 | | I_RXD/TXD+ | TWISTED PAIR #9 | <---- | RD+ | | J2-R |
| J1-18 | | I_RXD/TXD- | | <---- | RD- | | J2-T |
| J1-2 | | O_TXCE/RXC+ | TWISTED PAIR #6 | ----> | SCTE+ | | J2-U |
| J1-15 | | O_TXCE/RXC- | | ----> | SCTE- | | J2-W |
| J1-4 | | I_RXC/TXCE+ | TWISTED PAIR #8 | <---- | SCR+ | | J2-V |
| J1-17 | | I_RXC/TXCE- | | <---- | SCR- | | J2-X |
| J1-3 | | B_TXC/TXC+ | TWISTED PAIR #7 | <---- | SCT+ | | J2-Y |
| J1-16 | | B_TXC/TXC- | | <---- | SCT- | | J2-AA |

J2 connector is a V.35 receptacle
J1 shorting block has 6 connections
J2 has 2 wires on 1 pin

FIG. 12L

V.35 DCE Male Cable

V.35 DCE Male 72-

| FROM | SB | SIGNAL | NOTE | DIRECTION | SIGNAL | PT | TO |
|---|---|---|---|---|---|---|---|
| J1-22 | X | MODE_1 | LOCAL | | | | |
| J1-23 | X | MODE_0 | CONNECTIONS | | | | |
| J1-25 | X | GND* | SHIELD | ----- | SHIELD GND | | J2-A |
| J1-11 | | I_CTS/RTS+ | TWISTED PAIR #4 | <----- | RTS | | J2-C |
| J1-12 | | I_DSR/DTR+ | | <----- | DTR | | J2-H |
| J1-8 | | O_RTS/CTS+ | TWISTED PAIR #2 | -----> | CTS | | J2-D |
| J1-7 | | O_DTR/DSR+ | | -----> | DSR | | J2-E |
| J1-6 | | B_DCD/DCD+ | TWISTED PAIR #1 | -----> | RLSD | | J2-F |
| J1-19 | X | GND* | | ----- | GND | X | J2-B |
| J1-13 | | B_LL/LL+ | TWISTED PAIR #3 | <----- | LT | | J2-K |
| J1-26 | X | GND | | ----- | GND | X | J2-B |
| J1-5 | | I_RXD/TXD+ | TWISTED PAIR #5 | <----- | SD+ | | J2-P |
| J1-18 | | I_RXD/TXD- | | <----- | SD- | | J2-S |
| J1-1 | | O_TXD/RXD+ | TWISTED PAIR #9 | -----> | RD+ | | J2-R |
| J1-14 | | O_TXD/RXD- | | -----> | RD- | | J2-T |
| J1-4 | | I_RXC/TXCE+ | TWISTED PAIR #6 | <----- | SCTE+ | | J2-U |
| J1-17 | | I_RXC/TXCE- | | <----- | SCTE- | | J2-W |
| J1-2 | | O_TXCE/RXC+ | TWISTED PAIR #8 | -----> | SCR+ | | J2-V |
| J1-15 | | O_TXCE/RXC- | | -----> | SCR- | | J2-X |
| J1-3 | | B_TXC/TXC+ | TWISTED PAIR #7 | -----> | SCT+ | | J2-Y |
| J1-16 | | B_TXC/TXC- | | -----> | SCT- | | J2-AA |

J2 connector is a V.35 plug
J1 shorting block has 5 connections
J2 has 2 wires on 1 pin

FIG. 12M

V.35 DTE to DCE Cable

V.35 DTE to DCE 72-

| FROM | SB | SIGNAL | NOTE | DIRECTION | SIGNAL | SB | TO |
|---|---|---|---|---|---|---|---|
| J1-22 | X | MODE_1 | LOCAL CONNECTIONS | | MODE_1 | X | J2-22 |
| J1-23 | X | MODE_0 | | | MODE_0 | X | J2-23 |
| J1-24 | X | MODE_DCE | | | | | |
| J1-25 | X | GND* | SHIELD | ----- | SHIELD GND | X | J2-25 |
| J1-8 | | O_RTS/CTS+ | TWISTED PAIR #4 | ----> | I_CTS/RTS+ | | J2-11 |
| J1-7 | | O_DTR/DSR+ | | ----> | I_DSR/DTR+ | | J2-12 |
| J1-11 | | I_CTS/RTS+ | TWISTED PAIR #2 | <---- | O_RTS/CTS+ | | J2-8 |
| J1-12 | | I_DSR/DTR+ | | <---- | O_DTR/DSR+ | | J2-7 |
| J1-6 | | B_DCD/DCD+ | TWISTED PAIR #1 | <---- | B_DCD/DCD+ | | J2-6 |
| J1-19 | X | GND* | | ----- | GND* | X | J2-19 |
| J1-13 | | B_LL/LL+ | TWISTED PAIR #3 | ----> | B_LL/LL+ | | J2-13 |
| J1-26 | X | GND | | ----- | GND | X | J2-26 |
| J1-1 | | O_TXD/RXD+ | TWISTED PAIR #5 | ----> | I_RXD/TXD+ | | J2-5 |
| J1-14 | | O_TXD/RXD- | | ----> | I_RXD/TXD- | | J2-18 |
| J1-5 | | I_RXD/TXD+ | TWISTED PAIR #9 | <---- | O_TXD/RXD+ | | J2-1 |
| J1-18 | | I_RXD/TXD- | | <---- | O_TXD/RXD- | | J2-14 |
| J1-2 | | O_TXCE/RXC+ | TWISTED PAIR #6 | ----> | I_RXC/TXCE+ | | J2-4 |
| J1-15 | | O_TXCE/RXC- | | ----> | I_RXC/TXCE- | | J2-17 |
| J1-4 | | I_RXC/TXCE+ | TWISTED PAIR #8 | <---- | O_TXCE/RXC+ | | J2-2 |
| J1-17 | | I_RXC/TXCE- | | <---- | O_TXCE/RXC- | | J2-15 |
| J1-3 | | B_TXC/TXC+ | TWISTED PAIR #7 | <---- | B_TXC/TXC+ | | J2-3 |
| J1-16 | | B_TXC/TXC- | | <---- | B_TXC/TXC- | | J2-16 |

J1 and J2 connectors are 26 pin 12in1 Small Serial Connectors
J1 shorting block has 6 connections
J2 shorting block has 5 connections

FIG. 12N

GENERIC SERIAL INTERFACE WITH AUTOMATIC RECONFIGURABILITY

This Application is a Division of Ser. No. 09/001,352 filed Dec. 31, 1997.

BACKGROUND OF THE INVENTION

This invention relates to a serial interface and more particularly to a generic interface that is automatically configurable for operation with different physical interfaces in either a data terminal equipment (DTE) mode or a data circuit terminating equipment (DCE) mode.

There are 12 primary serial interfaces currently used in industry. These interfaces include Electronics Industry Association/Telecommunications Industry Association (EIA/TIA) EIA/TIA-232, EIA/TIA-449, EIA/TIA-530, and EIA/TIA-530A. These interfaces are also well known in the industry under the former EIA prefix "RS-" as RS-232, RS-449, RS-530, and RS-530A. Additional interfaces include International Telecommunications Industry (ITU) X.21 and V.35.

Each interface standard defines electrical characteristics of the serial signals, the number of interface pins and how the pins are connected to the interface signals. Each serial interface operates either as a DTE or as a DCE. A terminal or computer is typically referred to as the DTE and a modem is typically referred to as the DCE. A signal that is an output on a DTE is the input to the DCE on the opposite end of the serial interface. The DCE is the clock master when communicating to the DTE.

Network Processing Nodes (NPNs), such as routers, modems and network servers, might use different serial interfaces. A different serial cable and different serial interface circuitry is required to connect together each different combination of serial interfaces on two NPNs. Since there are so many different serial interfaces, many different serial cables, connectors and interface circuits are needed. Selecting and installing the right cable is difficult since the operator often does not know the specific serial interface used on each NPN.

Instead of supporting multiple serial cables, a NPN could support one generic serial interface which would be a super set of all other serial interfaces. The generic interface would use a generic connector which would connect to a transition cable which would then connect to the specific interface.

Existing generic serial interfaces include a generic connector on a first end of a transition cable. A second end of the cable includes a connector that conforms to one of the serial interface standards. However, these generic interfaces use a large number of different signals and as a result require a large connector with a large number of pins. Therefore, the generic interface circuitry used for configuring the large number of signals on the generic interface to different serial interfaces is also complex. Moreover, some generic serial interface cables include resistors in the cable which add cost and lower reliability.

Accordingly, a need remains for a generic serial interface that uses fewer generic signals and, in turn, fewer connector pins and less complex interface circuitry.

SUMMARY OF THE INVENTION

A generic serial interface includes one of a variety of different transition cables each having a first interface at a first end including a connector conforming to one of several different serial interface standards. The transition cable provides a mode signal that identifies the type of serial interface. A second end of the cable includes a generic interface having a generic connector that remains the same for each different transition cable. The generic interface is assigned a unique set of generic signals that are connected to associated signals on any one of the different interfaces that may exist on the opposite end of the cable.

An interface circuit is coupled to the generic connector and is automatically reconfigured according to the type of interface associated with the transition cable. The interface circuit includes a termination resistor array that is selectively connected to different data and clock signals according to the types of cable interface. The termination resistor array in combination with the novel assignment of generic signals allow the generic interface to be compatible with all commonly used interfaces both in DCE and DTE modes while using substantially fewer connector pins and simpler interface circuitry than existing generic interfaces.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2 is a schematic diagram of a generic connector used in the generic serial interface shown in FIG. 1.

FIG. 3 is a schematic diagram of two stacked generic connectors.

FIG. 4 is table showing the signal assignments according to the invention for the generic connectors in FIGS. 2 and 3.

FIGS. 8 and 9 are circuit diagrams showing how a bidirectional loopback signal is used to reduce the number of serial control signals in the generic interface.

FIG. 10 is a table showing alternative signal assignments for the generic control signals.

FIGS. 12A–12N are tables showing interconnections for different transition cables used in the generic interface shown in FIG. 1.

DETAILED DESCRIPTION

Figure 1:
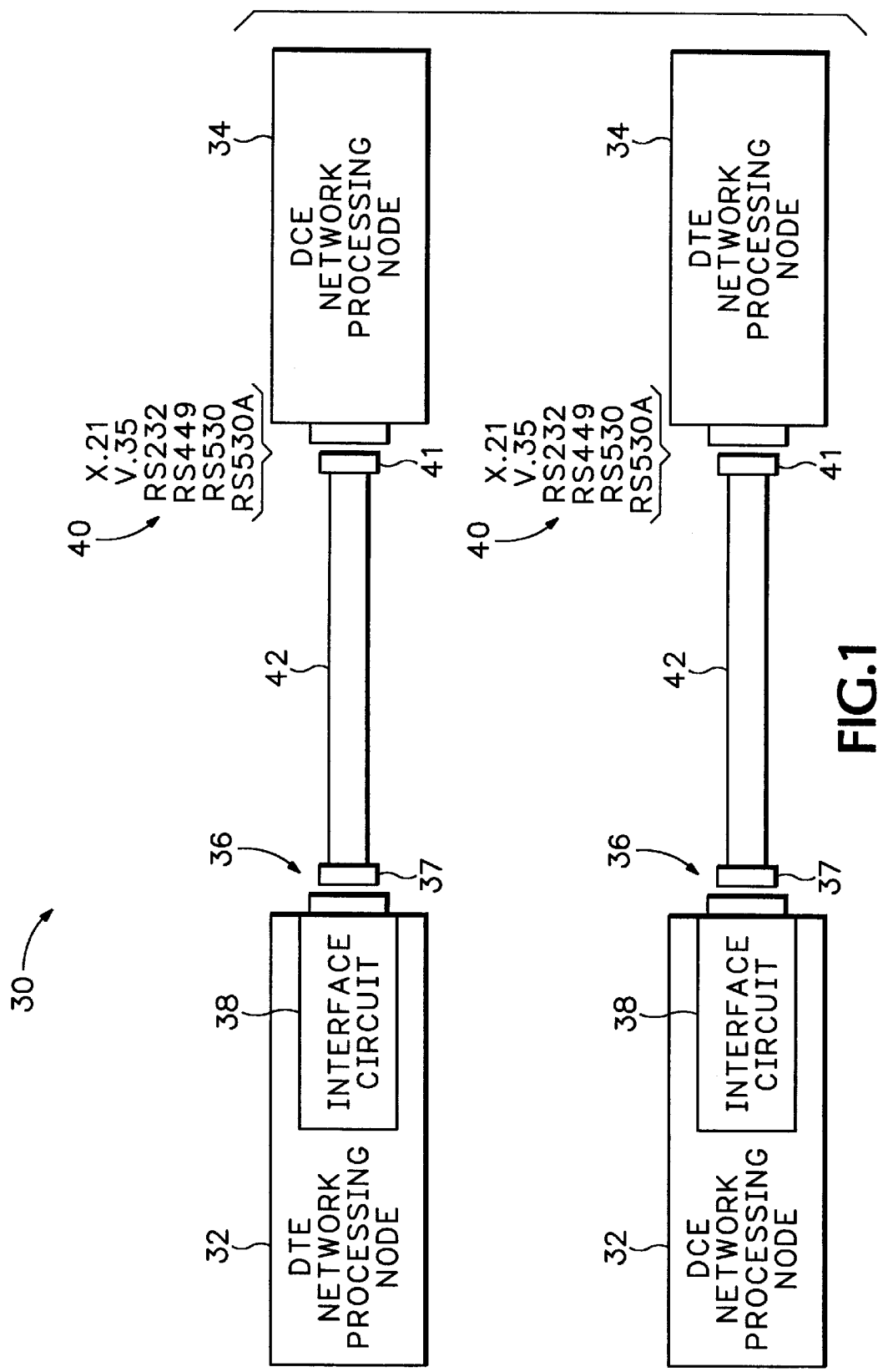
FIG. 1 is a schematic diagram of a generic serial interface according to the invention.

Referring to FIG. 1, a generic serial interface 30 includes a first interface 40 that conforms with any one of multiple serial interface standards. The interface 40 includes a connector 41 that connects a transition cable 42 to a first Network Processing Node (NPN) 34. A second generic interface 36 is connected to an opposite end of the transition cable 42 and includes a generic connector 37 coupled to a second NPN 32. An interface circuit 38 is coupled to generic connector 36 and is configured to provide signal compatibility with any of the multiple serial interfaces used on NPN 34. Note that the NPN 34 has a connector for its specific serial interface and the transition cable 42 has a connector for its specific serial interface.

While not limited to any specific number of interfaces, the generic interface 36 is compatible with at least the following six interface standards X.21, V.35, RS232, RS449, RS530 and RS530A in either a DTE or DCE mode. The generic interface 36 is shown operating in a DTE mode in the top circuit in FIG. 1 and is shown automatically configured to operate in a DCE mode in the bottom circuit in FIG. 1.

The NPNs 32 and 34 are defined as any router, modem, network server, etc. and includes a processor 31 (FIG. 5) which responds to the reconfiguration of the interface circuit 38 according to the type of serial interface identified by the transition cable 42.

Referring to FIG. 2, the generic connector 37 for the transition cable 42 in one embodiment has 26 pins coupled to different twisted wire pairs (see FIGS. 12A–12N) in transition cable 42. The 26 pins are connected through the twisted wire pairs to any one of the different connectors 41 (FIG. 1) used with the serial interface 40 on the opposite end of transition cable 42. The pins in generic connector 37 are assigned generic signals described below in FIG. 4. While not limited to the specific configuration shown in FIG. 2, the connector 37 has 26 pins. Additional pins can be added for additional signals or additional grounding.

FIG. 3 shows an alternative generic connector configuration. Two dual stacked 26 pin generic connectors 37 couple two generic interfaces 36 to the NPN 32 at the same time. Pins A1–A26 are associated with pins 1–26, respectively, in FIG. 2 and pins B1–B26 are associated with pins 1–26, respectively, in FIG. 2. An NPN 32, such as a router, can use the dual stacked interface to send network packets between two different serial interfaces. The dual stacked connectors 37 provide the router 32 with two different serial interfaces using substantially fewer connector pins and simpler interface logic than existing serial interface cables.

Referring to FIG. 4, a table 44 shows the signals assigned to the pins in the generic connector 37. The naming conventions for the signals in table 44 include a first letter that indicates signal direction: O=output, I=input, B-bidirectional. The name before the "/" indicates the signals used in DTE mode. The name after the "/" indicates the signals used in DCE mode.

All signals with a matching "+" and "−" have those two signals sharing the same twisted wire pair. For example, O_TXD/RXD+ and O_TXD/RXD− are connected to the same twisted wire pair in transition cable 42. The twisted wire pairs are coupled to adjacent pins in connector 37 (FIG. 2). The X.21, V.35, and RS232 cables use 9 twisted wire pairs. The RS449, RS530, and RS530A cables use 12 twisted wire pairs. Any single one of the clock or data differential signals are grounded for unbalanced signal interfaces. The unique assignment of two signals to the same connector pin as shown in FIG. 4 provide a reduced set of generic signals that can interface to all six interfaces in both DTE and DCE modes. The signal assignments below are described first for the DTE mode and then for the DCE mode.

MODE 1–3 Mode indication signals. Identifies the type of physical interface associated with the cable. The mode pins also uniquely identify when no cable is attached. The mode indication signals are asserted by pre-connecting the mode pins 2, 1, and 0 either to ground or to a voltage source via resistors. When no cable is attached, the logical value of the mode pins becomes "111" identifying the "NO CABLE MODE." Table 1 further defines the functions of mode pins 2, 1, and 0.

O_TXD/RXD+,-
    DTE mode: Transmit Data. Data transmitted from the DTE to the DCE.
    DCE mode: Receive Data. Data received from the DTE to the DCE.

O_TXCE/RXC+,-
    DTE mode: Transmit Clock Echo. Transmit clock echoed from the DTE back to the DCE.
    DCE mode: Receive Clock. Clock synchronized with Receive Data from DCE.

B_TXC/TXC+,-
    DTE and DCE mode: Transmit Clock. Clock sourced from the DCE and synchronized with Transmit Data.

I_RXC/TXCE+,-
    DTE mode: Receive Clock. Clock synchronized with Receive Data from DCE.
    DCE mode: Transmit Clock Echo. Transmit clock echoed from the DTE back to the DCE.

I_RXD/TXD+,-
    DTE mode: Receive Data. Data received by the DTE from the DCE.
    DCE mode: Transmit Data. Data transmitted by the DCE to the DTE.

B_DCD/DCD+,-
    DTE and DCE mode: Data Carrier Detect. The DCE asserts DCD when a carrier is detected on the Wide Area Network (WAN).

O_DTR/DSR+,-
    DTE mode: Data Terminal Ready. Typically, DTE asserts DTR when powered up.
    DCE mode: Data Set Ready. Typically, DCE asserts DSR when powered up.

O_RTS/CTS+,-
    DTE mode: Request To Send. RTS asserted by the DTE when DTE has data to send.
    DCE mode: Clear To Send. CTS asserted by the DCE when DCE has data to send.

I_CTS/RTS+,-
    DTE mode: Clear To Send. Assertion of CTS indicates the DCE is prepared to accept data.
    DCE mode: Request To Send. Assertion of RTS indicates the DTE is prepared to send data.

I_DSR/DTR+,-
    DTE mode: Data Set Ready. Typically, DCE asserts DSR when powered up.
    DCE mode: Data Transmit Ready. Typically, DTE asserts DTR when powered up.

B_LL/LL+
    DTE and DCE mode: Loopback signal used for locally testing the DCE by DTE.

TABLE 1

| Mode Bit 2 | Bit 1 | Bit 0 | Function |
|---|---|---|---|
| 0 | 0 | 0 | Not used |
| 0 | 0 | 1 | 530A |
| 0 | 1 | 0 | 530 |
| 0 | 1 | 1 | X.21 |
| 1 | 0 | 0 | V.35 |
| 1 | 0 | 1 | 449 |
| 1 | 1 | 0 | 232 |
| 1 | 1 | 1 | NO CABLE |

The control signals DTR, DSR DCD, RTS, and CTS may have functions different or in addition to the ones mentioned above.

Standard serial interfaces include three additional signals: test mode (TM), remote loopback (RL), and ring indicate (RI). These signals are not required in the present invention. By eliminating these three signals and by making the loopback signal B_LL/LL a bidirectional signal, the total number of connector pins required is kept at a standard 26.

The signals TXD and RXD are defined generally as data signals. The signals TXCE, TXC and RXC are defined generally as clock signals. The signals DCD, DTR, DSR, RTS, CTS and LL are defined generally as control signals.

Figure 5:
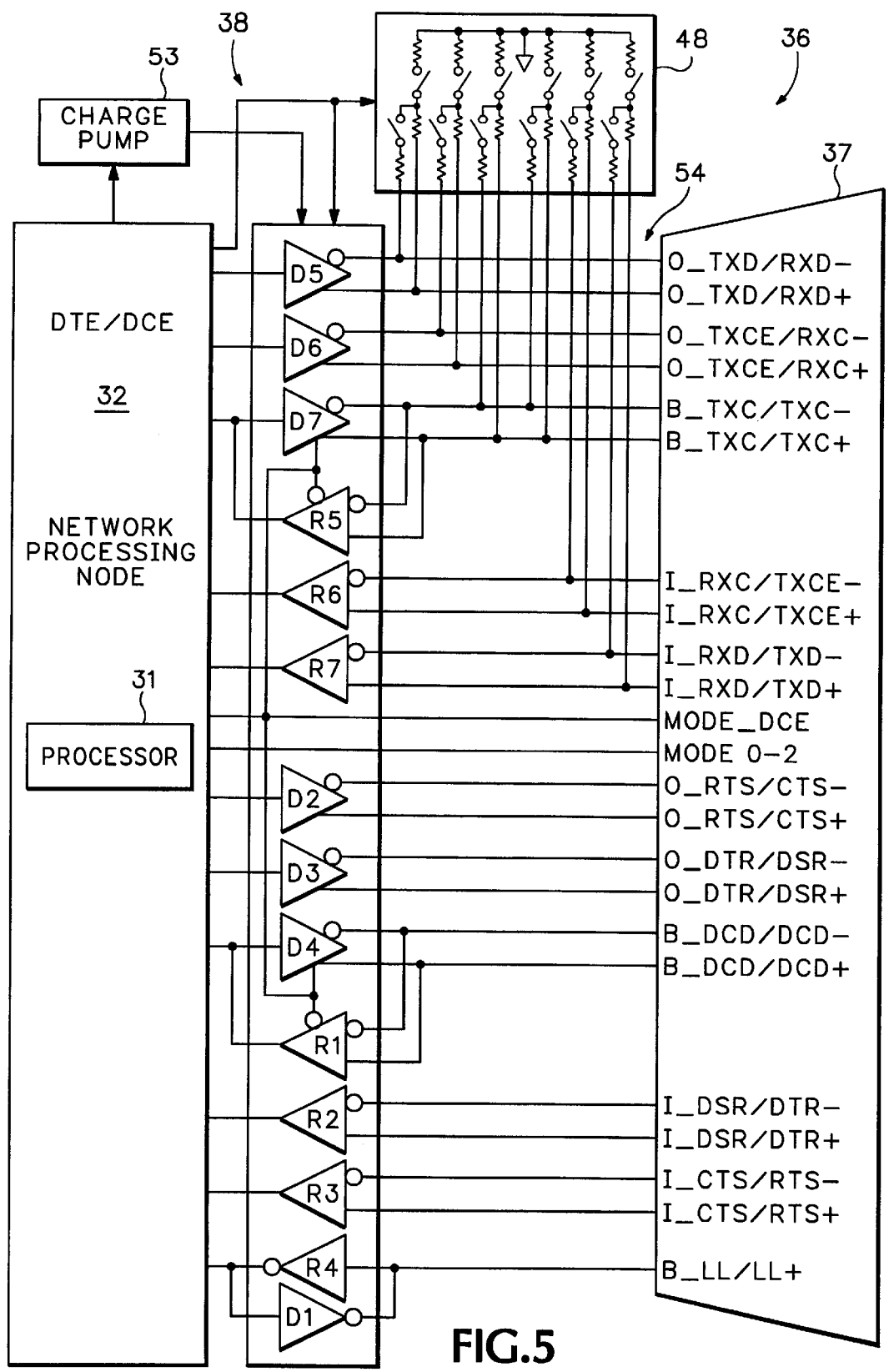
FIG. 5 is a schematic diagram of interface circuitry used in the generic interface shown in FIG. 1

Referring to FIG. 5, the connector 37 is coupled to the interface circuit 38. Except for the loopback signal LL, all drivers and receivers in interface circuit 38 are coupled by differential signal pairs to adjacent pins in the connector 37.

The transceiver comprising driver D7 and receiver R5 both receives and transmits the transmit clock signal TXC. A second transceiver comprising driver D4 and receiver R1 both receives and transmits one of the control signals, such as the DCD signal. A third transceiver comprising driver D1 and receiver R4 both receives and transmits loopback signal B_LL/LL. Loopback signal B_LL/LL is a an output for the DTE and an input for the DCE.

When the generic interface 36 operates in the DTE mode, the MODE_DCE signal is asserted low which enables the receiver R5, disables the driver D7, enables the receiver R1 and disables the driver D4. The interface circuit 38 is then configured to receive the transmit clock signal TXC and the carrier detect signal DCD. Conversely, when the MODE_DCE signal is asserted high (DCE mode), the interface circuit 38 is automatically configured to transmit the TXC and DCD signals. The MODE_DCE signal is defined in Table 2.

TABLE 2

| MODE_DCE | Function |
| --- | --- |
| 0 | DTE |
| 1 | DCE |

A differential driver D5 transmits the O_TXD/RXD signal, a differential driver D6 transmits the O_TXCE/RXC signal, a differential receiver R6 receives the I_RXC/TXCE signal, and a differential receiver R7 receives the I_RXD/TXD signal. A differential transmitter D2 transmits the O_RTS/CTS signal, a differential transmitter D3 transmits the O_DTR/DSR signal, a differential receiver R2 receives the I_DSR/DTR signal, and a differential receiver R3 receives the I_CTS/RTS signal.

In a preferred embodiment, the termination resistor array 48 is an integrated circuit that is electronically switchable. Resistors in termination resistor array 48 are automatically coupled to selected clock and data signals by the processor 31 according to the mode signals MODE 0–2 and MODE_DCE signal. Different combinations of termination resistors 48 are selectively coupled to one or both of the differential pairs for the TXD signal, TXCE signal, TXC signal, RXC signal, and RXD signal.

The termination resistors 48 electrically terminate lines to prevent signal reflections at high switching speeds. Different serial interface standards define different resistor termination values. The termination resistor array 48 has multiple resistor configurations that can be electronically coupled to the same data and clock signals.

Because multiple termination resistors can be automatically coupled to the same generic signals on connector 37, the same connector pins can be used with a wider variety of different serial interface standards. Previous generic interfaces had to use multiple pins each hard wired to a single predefined termination resistor value. The different pins then had to be multiplexed to an interface circuit depending on the type of termination required by the interface. The termination resistor array 48 according to the invention allow different termination resistor values to be automatically reconfigured for the same generic connector pin for both balanced and unbalanced serial interface modes. Thus, the generic connector 37 requires fewer pins.

Only clock and data lines are selectively terminated. It is desirable that the control signals go to an off state to prevent transients from causing false signaling. If resistors were coupled to the control signals, the control signals could not be reliably driven to off values. This concept is referred to as "Fail-Safe." In the event that there is a cable present, but no signals driving the control signals input I_CTS/RTS, I_DSR/DTR, and B_DCD/DCD, then the output of these receivers must default to a logic high which corresponds to a de-asserted state. If termination resistors are present, it becomes difficult to bias the termination resistors to a de-asserted state. Thus, termination of the control signals is optional and is usually omitted.

Because the control signals typically operate at slower speeds than the clock and data signals, termination resistors are less critical to dampen signal reflections. Thus, to save power and to prevent false signaling, the control signals are not coupled to termination resistors.

Of particular interest in the generic interface signals are the combination of the clock signals TXC, RXC and TXCE. By using a common bidirectional pin for the B_TXC/TXC+,– signal in combination with using a common pin for the O_TXCE/RXC+,– signal and a common pin for the I_RXC/TXCE+,– signal, fewer pins and less circuitry is required on the generic interface.

Figure 6:
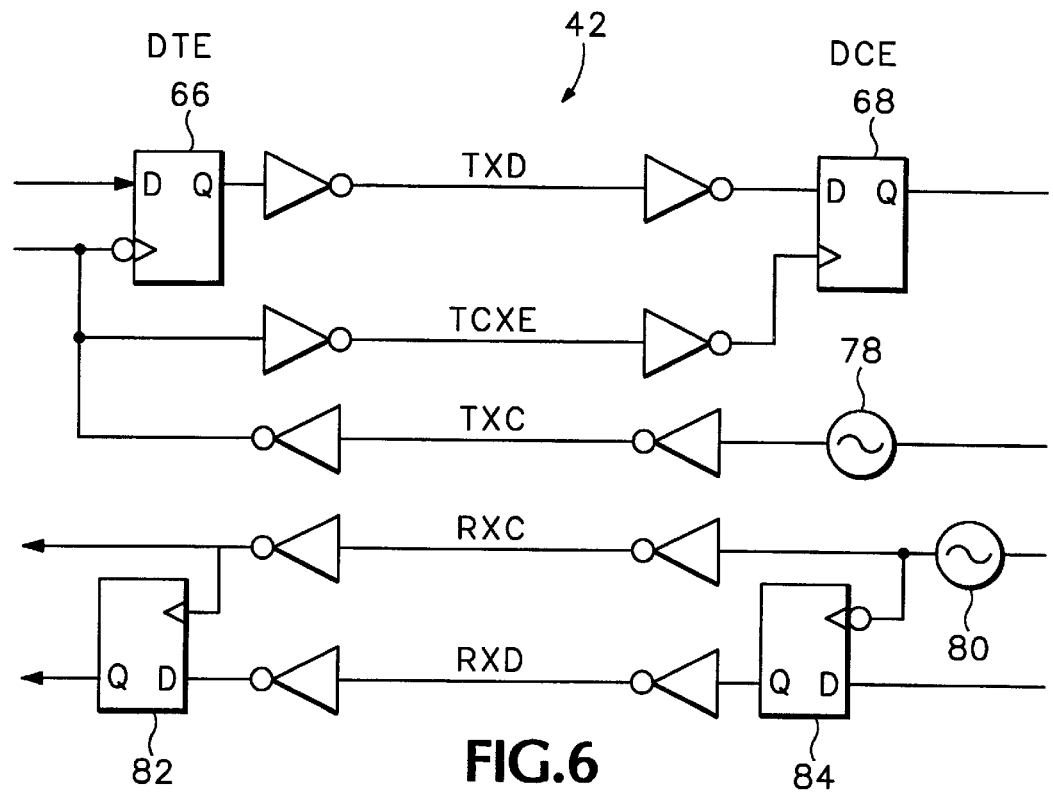
FIG. 6 is a circuit diagram of different data and control signals transmitted between a DTE and DCE.

Referring to FIG. 6, the DCE is typically the clock source for the transmit clock TXC and the receive clock RXC. The DCE typically includes a clock generator 80 that generates the receive clock RXC. The receive data RXD is synchronized with the receive clock RXC by a flip-flop 84. The receive clock RXC and the receive data RXD are then synchronized at the opposite end of the cable in the DTE by a flip-flop 82.

A clock generator 78 outputs the transmit clock TXC from the DCE to the DTE. The DTE uses flip-flop 66 to synchronize the transmit data TXD with the transmit clock TXC. The TXC clock is fed back as the TXCE signal over line 70 to the DCE. The DCE then uses flip-flop 68 to synchronize the transmit data TXD with the echo clock TXCE.

If the transmit clock TXC were used by the flip-flop 68 in the DCE to clock the transmit data TXD, propagation delays through the cable 42 would cause the transmit data TXD and the transmit clock TXC to be out of phase. Data at flip-flop 68 could then be corrupted if the transmit data TXD and the transmit clock TXC changed logic states at the same time. To maintain the same phase relationship between TXD and TXC, the TXC clock is echoed back to the DCE as the TXCE signal. Because the TXD and TXCE signals experience the same propagation delay, they both remain in phase when receive by flip-flop 68 in the DCE.

Figure 7:
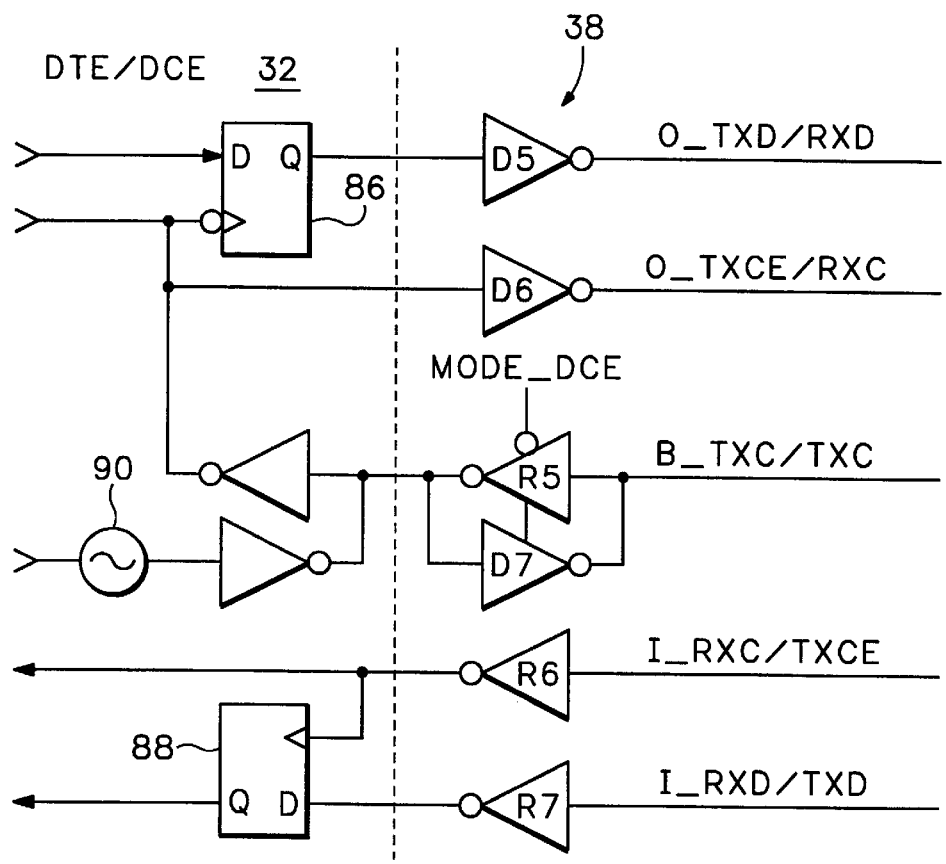
FIG. 7 is a circuit diagram showing unique signal assignments according to the invention for serial data and control signals shown in FIG. 6

The signal designations and driver configuration in FIG. 7 reduce the number of pins and reduce the complexity of the interface circuitry needed in the generic serial interface 36 to support the three serial clocks RXC, TXC and TXCE and the two serial data signals TXD and RXD when combining DTE and DCE modes. For simplicity, signals in FIG. 7 are shown in an unbalanced single wire configuration. However, all drivers and receivers are actually implemented as differential pairs. The interface circuit 38 uses the same driver D5 for both transmitting the TXD signal in the DTE mode and transmitting the RXD signal in the DCE mode. The same driver D6 is used for both transmitting the TXCE signal in the DTE mode and transmitting the RXC signal in the DCE mode. By intelligently making the TXC signal bidirectional with receiver R5 and driver D7, a simple clocking circuit can be used with any one of the six interface standards in either DTE or DCE modes.

For example, if the transmit data signal TXD were bidirectional, a transceiver would have to be coupled to the TXD signal and controlled depending upon whether the NPN 32 was operating in a DTE or DCE mode. Further, flip-flop 66 (FIG. 6) used for transmitting the TXD signal is not bidirectional. Thus, two separate flip-flop circuits would be required in the interface circuitry, one for the DTE mode and one for the DCE mode. If made bidirectional, the receive data signal RXD and receive clock RXC would also require separate synchronization circuits for both the DTE mode and the DCE mode.

The signal assignments and interface circuitry shown in FIG. 7 require only two flip-flops 86 and 88 along with only one bidirectional transceiver R5, D7 to support all 6 serial interface standards in both DTE and DCE modes. In the DTE mode, the bidirectional signal B_TXC/TXC is used to receive the transmit clock TXC that clocks flip-flop 86 and also drives the TXCE signal on the O_TXCE/RXC line.

In the DCE mode, the bidirectional signal B_TXC/TXC is used for outputting the transmit clock TXC from a clock generator 90 while the receive data RXD and receive clock RXC are output on the O_TXD/RXD and O_TXCE/RXC lines, respectively. The echo clock TXCE is then received on the I_RXC/TXCE line and the transmit data is received on the I_RXD/TXD line.

Regarding the control signals, the loopback signal LL is separated from all other control signals. The remaining control signals DTR, RTS, DCD, CTS and DSR are all required to be differential signals in at least one of the 6 serial interface standards. However, the loopback signal LL is never required to be a differential signal. By isolating the loopback signal LL on one pin and transceiver in both DTE and DCE modes and not combining the LL signal with another control signal, one additional pin is saved on the generic connector 37.

FIG. 8 shows the four signals that would be required if the LL signal were combined with any one of the differential signals, such as DCD. Conversely, FIG. 9 shows how the number of signals is reduced to three signals when the LL signal is implemented with a bidirectional transceiver and separated from the other control signals. FIG. 10 shows a table 86 providing three examples of how the serial control signals are implemented using only eleven pins. There are several other signal configurations of the control signals that are implemented using only eleven pins with two differential output signal pairs, two differential input signal pairs, one differential bidirectional signal pair and a single bidirectional loopback signal. For simplicity, the other combinations are not shown.

Figure 11:
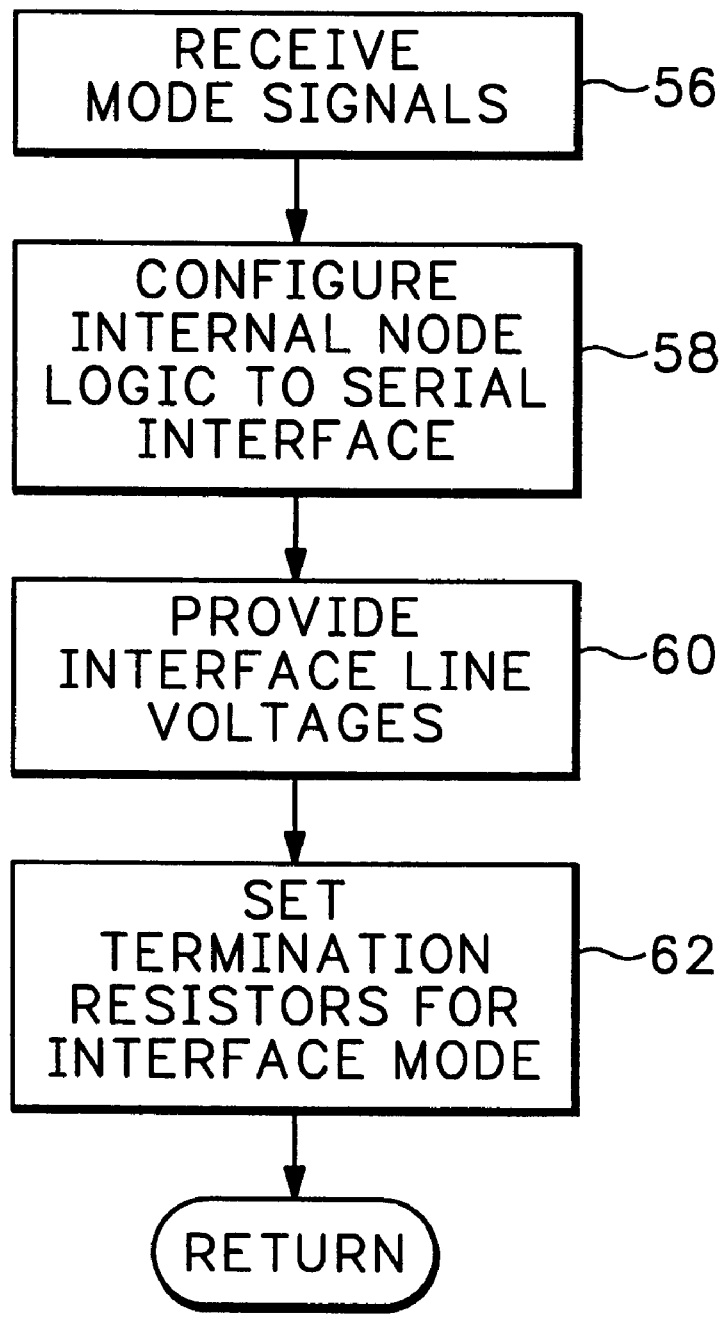
FIG. 11 is a flow diagram showing how the serial interface is automatically reconfigured.

Referring to FIG. 11, the NPN 32 receives the mode signals MODE 0–2 and the MODE_DCE signal from the transition cable 42 in step 56. In step 58, the interface is automatically configured according to the mode signals MODE 0–2 and the MODE_DCE signal. Thus, the hardware included in the transition cable 42 completely and, independently of NPN 32, identifies the appropriate interface. For example, the necessary clock signals are enabled along with the necessary data and control signals. In step 60, the line drivers D1–7 and receivers R1–7 are provided with the required line voltage levels for the identified interface. In step 62, the mode select pins couples selected termination resistors in termination resistor array 48 to selected data and clock signals on connector 37 according to the interface identified by the transition cable.

FIGS. 12A–12N are tables showing the different wire connections between the generic connector 37 and any one of 12 different transition cables 42 as follows:

FIG. 12A X.21 DTE cable,
FIG. 12B X.21 DCE cable,
FIG. 12C V.35 DTE cable,
FIG. 12D V.35 DTE cable,
FIG. 12E RS 232/V.24 DTE cable,
FIG. 12F RS 232/V.24 DCE cable,
FIG. 12G RS 449/V.36 DTE cable,
FIG. 12H RS 449/V.36 DCE cable,
FIG. 12I RS 530 DTE cable,
FIG. 12J RS 530 DCE cable,
FIG. 12K RS 530A DTE cable,
FIG. 12L RS 530A DCE cable. The first column of the tables in FIGS. 12A–12N give pin references for a J1 generic connector 37. A second column identifies which mode signals are grounded by a shorting block (not shown) in the cable 42. A third column gives the generic signal designations for the pins in the connector 37 according to the invention. A fourth column gives the twisted wire pairs coupled to the pins in the connector 37 and a fifth column gives the direction for the generic signals. A sixth column identifies the signals for the specific interface used on the opposite end of the transition cable 42. A seventh column identifies which pins on the connector 41 at the opposite end of the transition cable 42 are connected to the serial interface signals in column six.

One of the multiple transition cables 42 described in FIGS. 12A–12N is coupled by the connector 41 to the NPN 34. The generic connector 37 is plugged into the NPN 32. Each one of the different cables 42 identifies the associated interface type by shorting the appropriate MODE 0–2 and MODE_DCE signals via a shorting block in the cable 42. The interface circuit 38 is automatically configured to the interface identified by the mode signals. Once the interface circuit 38 is configured, serial communications with NPN 34 can begin.

As is shown by FIGS. 12A–12O, the same 26 generic signals in column three can be used to interconnect to six different serial interfaces in both the DTE and DCE mode. Thus, the generic interface 30 has fewer wires, connector pins and less complex interface circuitry than existing generic interfaces.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A serial interface system, comprising:
   a first one of multiple serial interfaces having one of multiple serial connectors for connecting to a first network processing node, the multiple serial interfaces each generating an associated "data terminal equipment/data circuit terminating equipment (DTE/DCE)" mode signal;
   a generic interface including a generic connector for coupling to a second network processing node, the generic interface having generic signals coupled to associated signals on any one of the multiple serial connectors; and an interface circuit including a transistor array coupled to the generic connector that automatically configures the generic interface for serial communications with any one of the multiple serial interfaces by automatically assigning to selected ones of the different generic signals on the generic interface different combinations of termination resistor values in the transistor array according to the DTE/DCE mode signal.

2. A serial interface system according to claim 1 wherein the interface circuit includes the following:

a first driver outputting a transmit echo clock TXCE in a DTE mode and outputting a receive clock RXC in a DCE mode;

a first receiver receiving the receive clock RXC in the DTE mode and receiving the transmit echo clock TXCE in the DCE mode; and a transceiver receiving a transmit clock TXC in the DTE mode and outputting the transmit clock TXC in the DCE mode.

3. A serial interface system according to claim 2 wherein the interface circuit includes the following:

a second driver transmitting a transmit data signal TXD in the DTE mode and transmitting a receive data signal RXD in the DCE mode; and a second receiver receiving the RXD signal in the DTE mode and receiving the TXD signal in the DCE mode.

4. A serial interface system according to claim 1 wherein the generic interface transmits and receives the following control signals in both a DTE and DCE mode:

a Data Carrier Detect signal DCD;

a Data Terminal Ready signal DTR;

a Request To Send signal RTS;

a Clear To Send signal CTS;

a Data Set Ready signal DSR; and a Loopback signal LL.

5. A serial interface system according to claim 4 wherein the interface circuit includes a transceiver for both driving and receiving the loopback signal LL independently of the other control signals.

6. A serial interface system according to claim 5 wherein the interface circuit includes the following:

a first driver transmitting the RTS signal in a DTE mode and transmitting the CTS signal in a DCE mode;

a second driver transmitting the DTR signal in the DTE mode and transmitting the DSR signals in the DCE mode;

a first receiver receiving the DSR signal in the DTE mode and receiving the DTR signal in the DCE mode;

a second receiver receiving the CTS signal in the DTE mode and receiving the RTS signal in the DCE mode; and a transceiver for receiving the DCD signal in the DTE mode and transmitting the DCD signal in the DCE mode.

7. A serial interface system according to claim 1 wherein the generic signals comprises a set of differential data signals, a set of differential clock signals, a set of differential control signals and a loopback signal; the termination resistor array only coupled to a positive and negative signal pair for each one of the differential data signals and each one to the differential clock signals.

8. A serial interface system according to claim 1 where the multiple serial interfaces comprise:

a X.21 serial interface;

a V.35 serial interface;

a RS232 serial interface;

a RS449 serial interface;

a RS530 serial interface; and a RS530A serial interface.

9. A serial interface system according to claim 8 wherein the generic connector has 26 pins and is coupled to different transition cables associated with each of the multiple serial interfaces, the transition cables each having only twelve or fewer twisted wire pairs.

10. A method for connecting devices together having different types of serial interfaces using a generic serial interface, comprising:

providing any one of multiple cables each having multiple differential wire pairs coupled at a first end to a first one of the different serial interface types for coupling to a first one of the devices;

designating generic signals on pins of a second generic interface on a second end of the cable;

coupling the differential wire pairs to the generic pins on the second generic interface according to the serial interface on the first end of the cable;

coupling the first end of the cable to a second one of the devices;

identifying at the second end of the cable the type of serial interface at the first end of the cable;

automatically configuring the generic interface to conform with the identified serial interface at the first end of the cable by coupling different selectable combinations of terminating resistors to selected generic signals on the second end of the cable; and conducting serial communications over the cable in both a data terminal equipment (DTE) mode and a "data circuit terminating equipment (DCE)" using a set of five generic signals for sending and receiving all clock and data signal in each serial interface type.

11. A method according to claim 10 including identifying the type of serial interface on the first end of the cable by grounding wires in the cables.

12. A method according to claim 10 wherein the generic interface conforms with any one of the following serial interfaces:

a X.21 serial interface;

a V.35 serial interface;

a RS232 serial interface;

a RS449 serial interface;

a RS530 serial interface; and a RS530A serial interface.

13. A method according to claim 10 including using a common one of the generic signals for both receiving and transmitting a loopback signal in isolation from the other generic signals.

* * * * *